United States Patent [19]

Henriquez et al.

[11] Patent Number: 5,058,791
[45] Date of Patent: Oct. 22, 1991

[54] VEHICULAR LADDER RACK

[75] Inventors: Kenneth R. Henriquez; Richard F. Arens, both of Hillsborough County, Fla.

[73] Assignee: Slide-Out, Inc., Tampa, Fla.

[21] Appl. No.: 477,536

[22] Filed: Feb. 9, 1990

[51] Int. Cl.$^5$ .............................................. B60R 9/00
[52] U.S. Cl. ................................... 224/310; 224/315; 224/324; 414/462; 248/210; 248/503
[58] Field of Search ............... 224/309, 310, 315, 324; 280/4; 414/462, 469, 470; 182/127; 248/503, 210, 211; 211/13

[56] References Cited

U.S. PATENT DOCUMENTS

| | | | |
|---|---|---|---|
| 3,013,681 | 12/1961 | Garnett | 280/4 |
| 3,251,519 | 5/1966 | Jones | 224/324 |
| 3,877,624 | 2/1975 | Carson | 248/503 |
| 3,904,094 | 9/1975 | Correll | 248/503 |
| 3,963,136 | 6/1976 | Sparke | 224/319 |
| 4,008,838 | 2/1977 | Correll | 182/127 |
| 4,081,095 | 3/1978 | Wilburn et al. | 414/462 |
| 4,170,331 | 10/1979 | Faulstich | 224/324 |
| 4,262,834 | 4/1981 | Nutt | 182/127 |
| 4,350,471 | 9/1982 | Lehmann | 224/310 |
| 4,390,117 | 6/1983 | Fagan | 182/127 |
| 4,826,387 | 5/1989 | Audet | 224/310 |
| 4,887,750 | 12/1989 | Dainty | 224/310 |

FOREIGN PATENT DOCUMENTS

| | | | |
|---|---|---|---|
| 2596344 | 10/1987 | France | 224/310 |
| 8004228 | 2/1981 | Netherlands | 224/310 |

Primary Examiner—Henry J. Recla
Assistant Examiner—Glenn T. Barrett
Attorney, Agent, or Firm—A. W. Fisher, III

[57] ABSTRACT

A vehicular ladder rack comprising a stationary mounting frame including a pair of transverse frame members affixed to the roof of a vehicle, a positioning assembly including a pair of positioning members affixed to opposite end portions of an elongated longitudinal positioning element rotatable between a first and second position coupled to the pair of transverse frame member and a ladder support frame including a pair of ladder support members movable between a first and second position to support a ladder thereon operatively coupled between the pair of transverse frame member and the corresponding positioning member such that a ladder is supported over the roof of the vehicle for storage and transportation when the elongated longitudinal positioning element and ladder support frame are in the first position and the ladder support frame is moved from the first to second position when the elongated longitudinal positioning element is rotated from the first to second position to move the ladder support frame from first to second position adjacent the side of the vehicle to permit a ladder to be mounted thereon or removed therefrom.

40 Claims, 3 Drawing Sheets

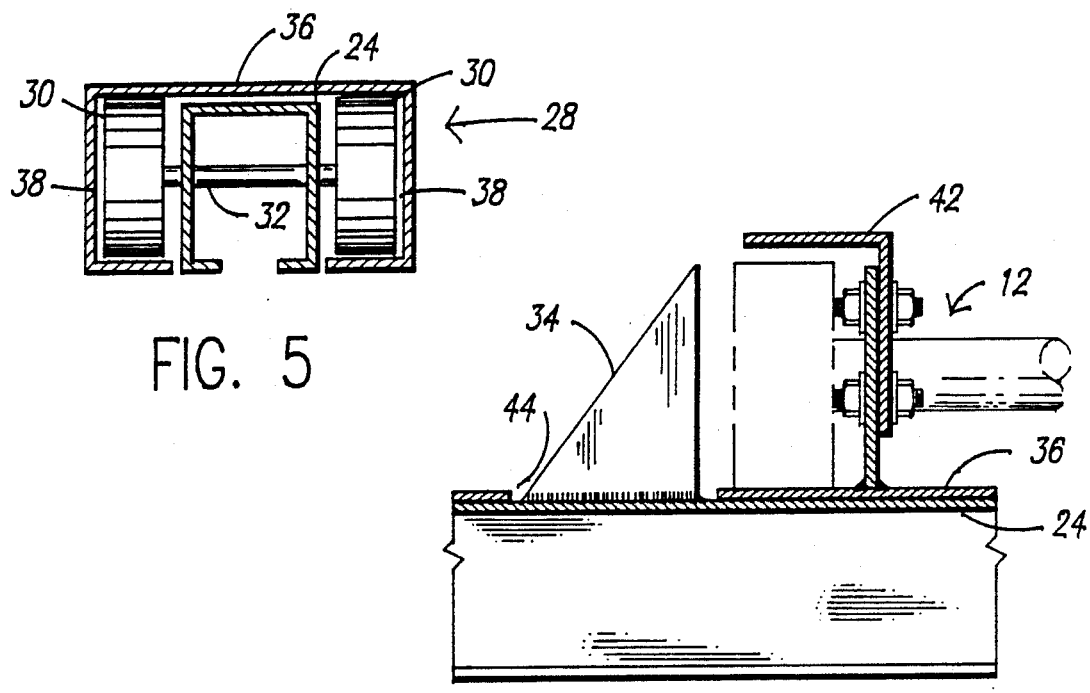
FIG. 5
FIG. 6
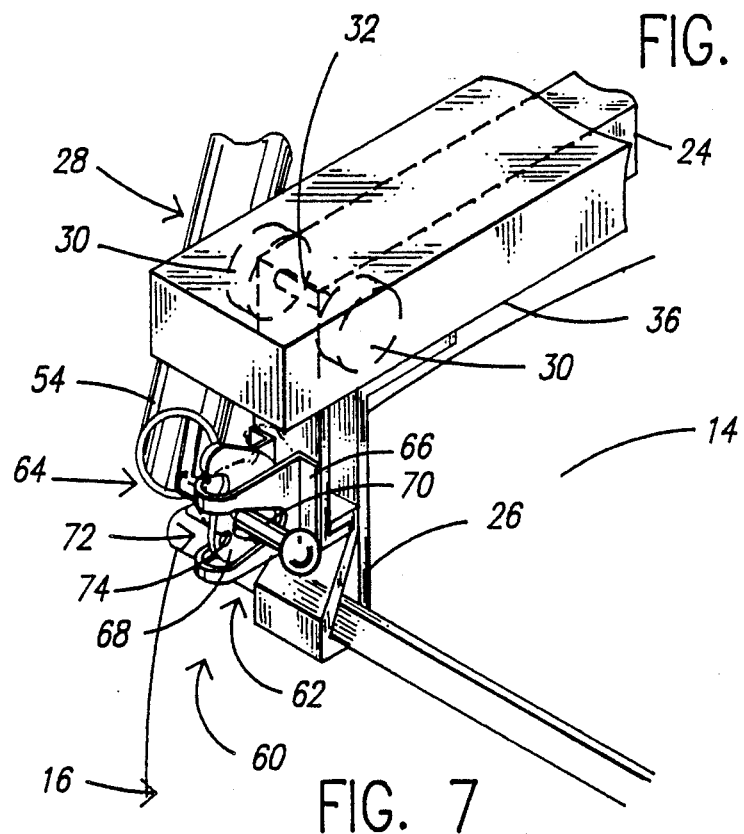
FIG. 7

VEHICULAR LADDER RACK

BACKGROUND OF THE INVENTION

1. Field of The Invention

A vehicular ladder rack to movably support a ladder thereon for use on a van or similar vehicle.

2. Description Of The Prior Art

It is common to transport ladders on vehicles such as vans and pickup trucks. Generally positioning ladders atop of such vehicles is awkward. In addition, retaining the ladder stationary during travel is difficult. For example, one end of the ladder at a time is ordinarily placed on the rack. Maintaining the first end in place while positioning the other end of the ladder into place may be a problem. Once the ladder is atop of the rack it is ordinarily free to move about producing objectionable noises and causing abrasive wear on the ladder and the rack. Moreover the ladder may become detached from the rack and fall to the ground. Accordingly, a simplified rack is needed that will facilitate mounting the ladders on top of vehicles and then secure the ladder in place to prevent movement and abrasive wear during transport but be easy to remove as desired.

U.S Pat. No. 3,013,681 discloses a device for storing an elongated article on a vehicle comprising a rack with a plurality of arms pivotally connected along an upper portion of the vehicle. The arms are movable about a horizontal axis and extend outwardly at substantially right angles to the length of the vehicle during movement between a down position and upright position.

U.S. Pat. No. 3,058,607 teaches a ladder rack for a vehicle comprising ladder-holding members, a pair of links pivotally attached to the vehicle in coaxial relation to each other at opposite ends thereof. A torque element is provided to transmit a turning force.

U.S. Pat. No. 3,963,136 shows a retractable ladder rack for use on the top of vehicles. The rack has one or more channel members which can be attached to the roof of the vehicle. The rack can slide along the channel members to a lower position to facilitate the loading and unloading of a ladder or similar object.

U.S. Pat. No. 4,170,331 discloses a ladder rack mounted on top of a vehicle including upstanding guide stops to hold one end of a ladder while the other end is being pivoted onto the rack.

U.S. Pat. No. 4,262,834 teaches a vehicle rack comprising a releasable clamping device for releasably clamping a ladder thereto. The clamping device includes a clamp arm which is pivoted to a rigid support and operated by a crank mechanism by moving across a dead-center position to secure the ladder in place.

U.S. Pat. No. 4,390,117 discloses a ladder rack for a vehicle roof comprising clamps for releasable attachment to the roof of a vehicle. A subframe carries front and rear ladder support assemblies each comprising transverse rollers for engaging the stringers of a ladder spanning the two assemblies.

U.S. Pat. No. 4,826,387 teaches a carrier which can be extended and retracted relative to the rack and hinged to facilitate loading and unloading of the material carried by the rack.

SUMMARY OF THE INVENTION

The present invention relates to a vehicular ladder rack to mount a ladder to the roof of a vehicle. More specifically, the vehicular ladder rack comprises a stationary mounting frame and a ladder support frame operatively interconnected by a positioning assembly to selectively move the ladder support frame between a first or retracted and second or extended position.

The stationary mounting frame comprises a pair of substantially horizontal parallel transverse frame members affixed to the roof of the vehicle. A limit member is affixed to each of the substantially horizontal parallel frame member to selectively engage the ladder when the ladder support frame is in the first a retracted position to limit inward transverse movement thereof as described more fully herein.

The ladder support frame comprises a pair of substantially parallel transverse ladder support members movable between the first or retracted and the second or extended position support frame member to support a ladder thereon. A retainer member is affixed to the inner portion of each of the substantially parallel ladder support members to engage the ladder to retain the ladder on the ladder support frame.

The positioning assembly comprises a pair of substantially parallel positioning member affixed to opposite end portions of an elongated longitudinal elongated positioning element movable between a first or retracted position and a second or extended position coupled between the pair of substantially horizontal parallel transverse frame members and the inner end portions of the corresponding substantially parallel transverse ladder support.

Normally the ladder support frame and substantially parallel positioning members are disposed in the first or retracted position such that the ladder support frame is disposed over on the roof of the vehicle. In this position, the limit members and retainer members cooperatively form a ladder securing means limiting transverse movement of the ladder relative to the vehicular ladder rack to secure the ladder to the vehicular ladder rack. In addition, the retainer members prevent removal of the ladder either vertically or longitudinally.

The movable ladder support frame may then be moved from the first or retracted position to the second or extended position by rotating the elongated longitudinal positioning element moving the substantially parallel positioning member from the first or retracted postion to the second or extended position such that the ladder support frame is disposed adjacent the side of the vehicle. In this position, a ladder may be placed on or removed from the ladder support frame and retainer members. The movable ladder support frame with or without a ladder may then be returned to the first or retracted position by reversing the operation.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 5 is a partial cross-sectional end view of a transverse ladder support member and corresponding directional control device.

FIG. 6 is a detailed cross-sectional side view of the ladder retainer means.

FIG. 7 is a detailed perspective view of the ladder rack lock.

Similar reference characters refer to similar parts throughout the several views of the drawings.

DETAILED DESCRIPTION OF THE PREFERRED EMBODIMENT

Figure 1:
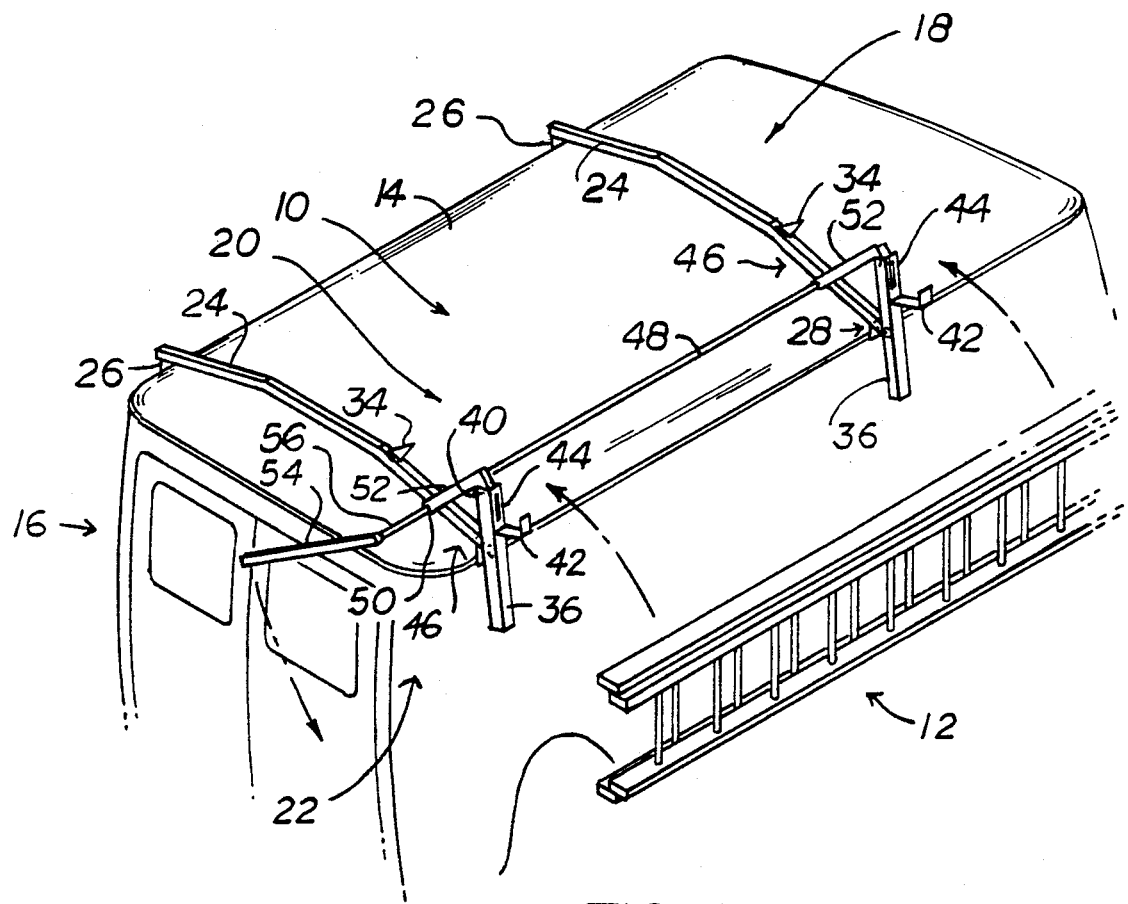
FIG. 1 is a perspective view of the vehicular ladder rack.

As best shown in FIGS. 1 through 4, the present invention relates to a vehicular ladder rack generally indicated as 10 to mount a ladder generally indicated as 12 to the roof 14 of a vehicle generally indicated as 16.

As best shown in FIGS. 1 through 4, the vehicular ladder rack 10 comprises a stationary mounting frame, ladder support frame and positioning assembly generally indicated as 18, 20 and 22 respectively.

As shown in FIGS. 1 through 4, the stationary mounting frame 18 comprises a pair of substantially parallel transverse C-shaped frame members each indicated as 24 affixed to opposite sides of the vehicle 16 by a mounting bracket 26.

As shown in FIGS. 3 through 5 and 7, a directional control device generally indicated as 28 is attached to corresponding end portions of each of the pair of the substantially horizontal parallel transverse C-shaped frame members 24 to control the direction of travel of the ladder support frame 20 as described more fully hereinafter. Each directional control device 28 comprises a pair of rollers each indicated as 30 rotatable coupled to opposite sides of the corresponding substantially horizontal parallel transverse C-shaped frame member 24 by an axle 32.

As best shown in FIGS. 1 through 4 and 6, a substantially vertical limit member 34 extends upwardly from the top of each of the pair of substantially parallel transverse C-shaped frame members 24 in spaced relationship relative to the corresponding directional control device 28 to limit inward movement of the ladder 12 when mounted on the vehicular ladder rack 10.

As best shown in FIGS. 1 through 4, the ladder support frame 20 comprises a pair of substantially parallel transverse C-shaped ladder support members each indicated as 36 movable between a first or retracted position and a second or extended postion. As shown in FIG. 5, each of the pair of substantially parallel transverse C-shaped ladder support members 36 includes a pair of channels each indicated as 38 to receive one roller 30 of each corresponding directional control device 28. The inner end of each of the pair of substantially parallel C-shaped ladder support members 36 is rotated coupled to the positioning assembly 22 by a coupling pin 40 as described more fully hereinafter. As shown in FIG. 6, an L-shaped retainer member 42 is affixed to the inner end portion of each of the pair substantially parallel transverse C-shaped ladder support frame member 36 to retain a ladder 12 on the ladder support frame 20 as described more fully hereinafter. An elongated slot 44 is formed in each of the pair of substantially parallel transverse C-shaped ladder support member 36 to receive the corresponding substantially vertical limit member 34.

Figure 3:
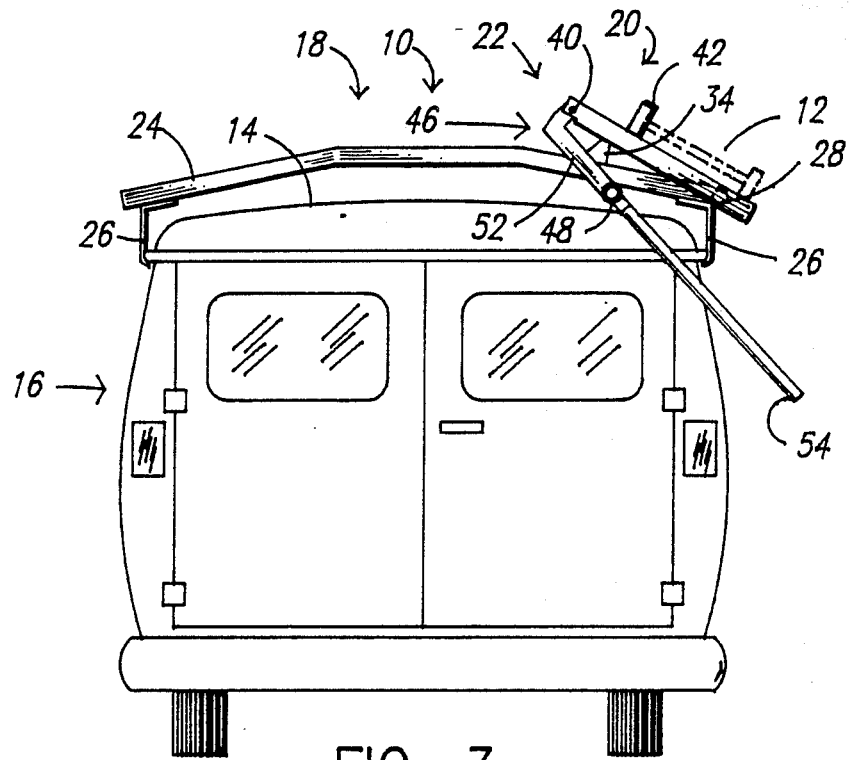
FIG. 3 is a rear view of the vehicular ladder rack in the intermediate position.
Figure 4:
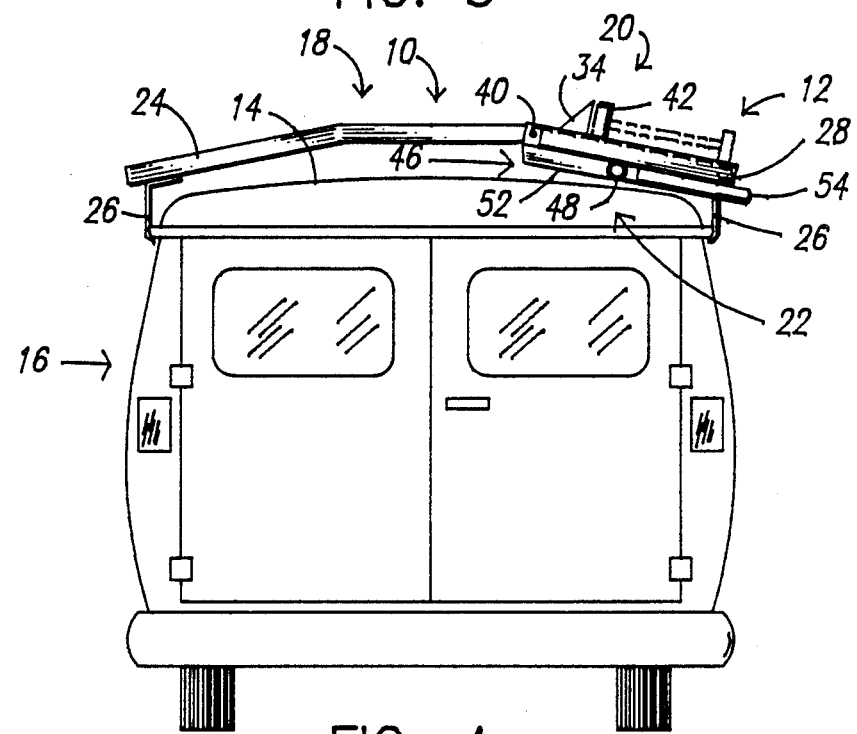
FIG. 4 is a rear view of the vehicular ladder rack in the fully retracted position.

As best shown in FIGS. 1,3 and 4, the positioning assembly 22 movable between a first or retracted position and a second or extended position comprises a pair of substantially parallel positioning members each generally indicated as 46 affixed to opposite end portions of an elongated longitudinal positioning element 48 rotatably coupled to each of the pair of substantially horizontal parallel transverse C-shaped frame members 24 by a corresponding mounting bracket or bearing each indicated as 50. As best shown in FIGS. 1,3, and 4, each of the pair of substantially parallel positioning members 46 comprises a substantially L-shaped positioning arm 52 coupled to the inner ends of the corresponding substantially parallel transverse C-shaped ladder support member 36 by the corresponding coupling pin 40. The positioning assembly 22 also includes an elongated handle 54 pivotally movable between an operative and locked postion coupled to the rear portion 56 of the elongated longitudinal positioning element 48 by a coupling pin 58. As best shown in FIG. 7, the positioning assembly 22 further includes a positioning assembly lock means generally indicated as 60 comprising a first and second lock element generally indicated as 62 and 64 respectively. The first lock element 62 comprises a lock bracket 66 affixed to the mounting bracket 26 or the rear transverse C-shaped frame member 24 having a retainer element 68 movable between an open and closed position pivotally coupled to the lock bracket 66. The second lock element 64 comprises a lock bar 70 affixed to outer end portion of the elongated handle 54.

Figure 2:
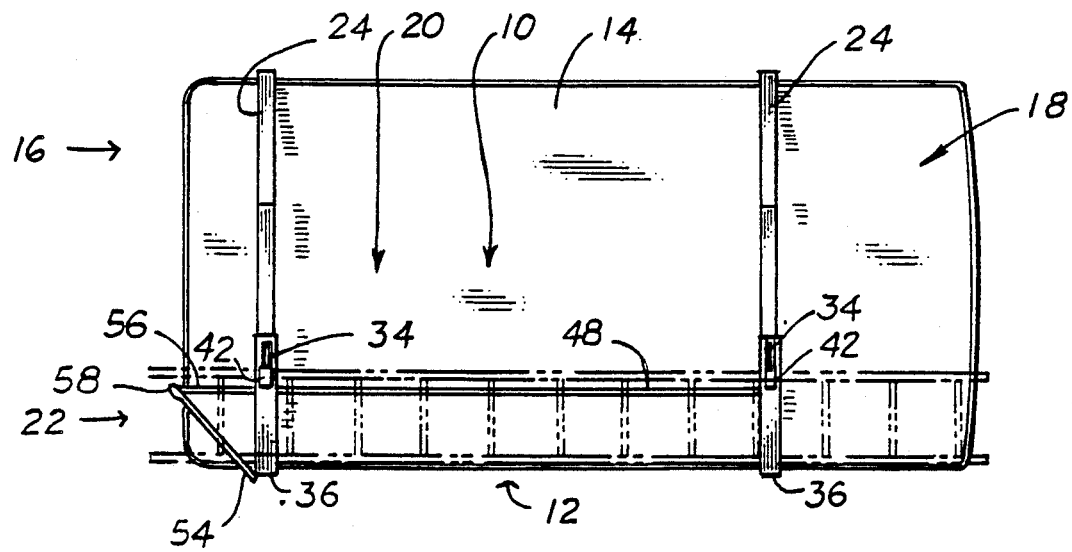
FIG. 2 is a top view of the vehicular ladder rack.

As shown in FIGS. 2 and 4, normally the ladder support frame 20 and substantially parallel positioning members 46 are disposed in the first or retracted position such that the ladder support frame is disposed over on the roof 14 of the vehicle 16. In this position, the substantially vertical limit members 34 and corresponding L-shaped retainer members 42 cooperatively form a ladder securing means limiting transverse movement of the ladder 12 relative to the vehicular ladder rack 10 to secure the ladder 12 to the vehicular ladder rack 10. In addition, the L-shaped retainer members 42 prevent removal of the ladder 12 either vertically or longitudinally from the vehicular ladder rack 10.

As shown in FIGS. 1 and 3, the ladder support frame 20 may then be moved from the first or retracted position to the second or extended position by rotating the elongated longitudinal positioning element 48 with the elongated handle 54 moving the substantially parallel positioning members 52 from the first or retracted position to the second or extended position such that the ladder support frame 20 is disposed adjacent the side of the vehicle 16. In this position, a ladder 12 may be placed on or removed from the ladder support frame 20 and L-shaped retainer members 42. The movable ladder support frame 20 with or without a ladder 12 may then be returned to the first or retracted position by reversing the operation.

To lock the ladder support frame 20 in the first or retracted position, the retainer element 68 is rotated to the open position (phantom in FIG. 7) to permit the lock bar 70 to be placed within the channel 72 of the lock bracket 66. The retainer element 68 is then returned to the closed position (FIG. 7). A pad lock (not shown) may then be placed through a lock aperture 74 formed in the retainer element 68 to secure the elongated handle 54 in the locked position.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A vehicular ladder rack for use with a vehicle comprising a stationary mounting frame including a pair of transverse frame members each including an end portion affixed to a roof of a vehicle, a positioning assembly including a pair of positioning members affixed to opposite end portions of an elongated longitudinal positioning element including a rear portion rotatable between a first and second position coupled to said pair of transverse frame member and a ladder support frame including a pair of ladder support members each including an inner end movable between a first and second position to support a ladder thereon operatively coupled between said pair of transverse frame members and said corresponding positioning members such that a ladder is supported above the roof of the vehicle for storage and transportation when said elongated longitudinal positioning element and said ladder support frame are each in said first position and when said ladder support frame is moved from said first to said second position as said elongated longitudinal positioning element is rotated from said first to said second position said ladder support frame is disposed adjacent a side of the vehicle to permit a ladder to be mounted on said ladder support frame or removed from said ladder support frame, said stationary mounting frame further includes a directional control device attached to said corresponding end portion of each of said pair of transverse frame members to engage and control the direction of travel of said pair of ladder support members, each of said pair of ladder support members comprises a C-shaped ladder support member including a pair of channels and each said directional control device comprises a pair of rollers rotatable coupled to opposite sides of each said transverse frame member wherein each said roller of each of said pair of rollers is disposed within one of said pair of channels of each said pair of ladder support members.

2. The vehicular ladder rack of claim 1 wherein said stationary mounting frame further includes a limit member extending upwardly from each of said pair of frame members in spaced relationship relative to said corresponding directional control device to limit inward movement of the ladder when mounted on said vehicular ladder rack.

3. The vehicular ladder rack of claim 2 wherein an elongated slot is formed in each of said pair of ladder support members to receive one of said limit members.

4. The vehicular ladder rack of claim 2 wherein a retainer member is affixed to each of said pair of ladder support frame members to retain a ladder therein to secure the ladder vertically and longitudianlly to said vehicular ladder rack.

5. The vehicular ladder rack of claim 4 wherein said limit members and said retainer members cooperatively form a ladder securing means limiting transverse movement of the ladder relative to said vehicular ladder rack to secure the ladder thereto.

6. The vehicular ladder rack of claim 1 wherein each of said pair of positioning members comprises a substantially L-shaped positioning arm coupled to said inner ends of said corresponding ladder support member by a corresponding coupling pin.

7. The vehicular ladder rack of claim 1 further including an elongated handle pivotally coupled to said rear portion of said elongated longitudinal positioning element by a coupling pin.

8. The vehicular ladder rack of claim 7 further including a positioning assembly lock means comprising a first and second lock element, said first lock element comprises a lock bracket affixed to said stationary mounting frame retainer element movable between an open and closed position pivotally coupled thereto and said second lock element comprises a lock bar affixed to outer end portion of said elongated handle; said lock bar being disposed between said lock bracket and said retainer element when said retainer element is in said closed position to secure said elongated handle to said positioning assembly lock means.

9. The vehicular ladder rack of claim 1 further including a retainer member is affixed to each of said pair of ladder support frame members to retain a ladder therein to secure the ladder vertically and longitudinally said vehicular ladder rack.

10. A vehicular ladder rack for use with a vehicle comprising a stationary mounting frame including a pair of transverse frame members each including an end portion affixed to a roof of a vehicle, a positioning assembly including a pair of positioning members affixed to opposite end portions of an elongated longitudinal positioning element including a rear portion rotatable between a first and second position coupled to said pair of transverse frame member and a ladder support frame including a pair of ladder support members each including an inner end movable between a first and second position to support a ladder thereon operatively coupled between said pair of transverse frame members and said corresponding positioning members such that a ladder is supported above the roof of the vehicle for storage and transportation when said elongated longitudinal positioning element and said ladder support frame are each in said first position and when said ladder support frame is moved from said first to said second position as said elongated longitudinal positioning element is rotated from said first to said second position said ladder support frame is disposed adjacent a side of the vehicle to permit a ladder to be mounted on said ladder support frame or removed from said ladder support frame, said stationary mounting frame further includes a directional control device attached to said corresponding end portion of each of said pair of transverse frame members to engage and control the direction of travel of said pair of ladder support members, said stationary mounting frame further includes a limit member extending upwardly from each of said pair of frame members in spaced relationship relative to said corresponding directional control device to limit inward movement of a ladder when mounted on said vehicular ladder rack.

11. The vehicular ladder rack of claim 10 wherein each said directional control device comprises at least one roller rotatable coupled to said corresponding transverse frame members.

12. The vehicular ladder rack of claim 11 wherein each of said pair of ladder support members comprises a C-shaped ladder support member including a pair of channels and each said directional control device comprises a pair of rollers rotatable coupled to opposite sides of each said transverse frame member wherein each said roller of each of said pair of rollers is disposed within one of said pair of channels of each said pair of ladder support members.

13. The vehicular ladder rack of claim 10 wherein a retainer member is affixed to each of said pair of ladder support frame members to retain a ladder therein to secure the ladder vertically and longitudinally to said vehicular ladder rack.

14. The vehicular ladder rack of claim 13 wherein said limit members and said retainer members cooperatively form a ladder securing means limiting transverse movement of the ladder relative to said vehicular ladder rack to secure the ladder thereto.

15. The vehicular ladder rack of claim 10 wherein an elongated slot is formed in each of said pair of ladder support members to receive one of said limit members.

16. The vehicular ladder rack of claim 10 wherein each of said pair of positioning members comprises a substantially L-shaped positioning arm coupled to said inner ends of said corresponding ladder support member by a corresponding coupling pin.

17. The vehicular ladder rack of claim 10 further including an elongated handle pivotally coupled to said rear portion of said elongated longitudinal positioning element by a coupling pin.

18. The vehicular ladder rack of claim 17 further including a positioning assembly lock means comprising a first and second lock element, said first lock element comprises a lock bracket affixed to said stationary mounting frame retainer element movable between an open and closed position pivotally coupled thereto and said second lock element comprises a lock bar affixed to outer end portion of said elongated handle; said lock bar being disposed between said lock bracket and said retainer element when said retainer element is in said closed position to secure said elongated handle to said positioning assembly lock means.

19. The vehicular ladder rack of claim 10 further including a retainer member is affixed to each of said pair of ladder support frame members to retain a ladder therein to secure the ladder vertically and longitudinally said vehicular rack.

20. A vehicular ladder rack for use with a vehicle comprising a stationary mounting frame including a pair of transverse frame members each including an end portion affixed to a roof of a vehicle, a positioning assembly including a pair of positioning members affixed to opposite end portions of an elongated longitudinal positioning element including a rear portion rotatable between a first and second position coupled to said pair of transverse frame member and a ladder support frame including a pair of ladder support members each including an inner end movable between a first and second position to support a ladder thereon operatively coupled between said pair of transverse frame members and said corresponding positioning members such that a ladder is supported above the roof of the vehicle for storage and transportation when said elongated longitudinal positioning element and said ladder support frame are each in said first position and when said ladder support frame is moved from said first to said second position as said elongated longitudinal positioning element is rotated from said first to said second position said ladder support frame is disposed adjacent a side of the vehicle to permit a ladder to be mounted on said ladder support frame or removed from said ladder support frame, each of said pair of positioning members comprises a substantially L-shaped positioning arm coupled to said inner ends of said corresponding ladder support member by a corresponding coupling pin.

21. The vehicular ladder rack of claim 20 wherein said stationary mounting frame further includes a directional control device attached to said corresponding end portion of each of said pair of transverse frame members to engage and control the direction of travel of said pair of ladder support members.

22. The vehicular ladder rack of claim 21 wherein each said directional control device comprises at least one roller rotatable coupled to said corresponding transverse frame members.

23. The vehicular ladder rack of claim 22 wherein each of said pair of ladder support members comprises a C-shaped ladder support member including a pair of channels and each said directional control device comprises a pair of rollers rotatable coupled to opposite sides of each said transverse frame member wherein each said roller of each of said pair of rollers is disposed within one of said pair of channels of each said pair of ladder support members.

24. The vehicular ladder rack of claim 21 wherein said stationary mounting frame further includes a limit member extending upwardly from each of said pair of frame members in spaced relationship relative to said corresponding directional control device to limit inward movement of the ladder when mounted on said vehicular ladder rack.

25. The vehicular ladder rack of claim 24 wherein an elongated slot is formed in each of said pair of ladder support members to receive one of said limit members.

26. The vehicular ladder rack of claim 24 wherein a retainer member is affixed to each of said pair of ladder support frame members to retain a ladder therein to secure the ladder vertically and longitudinally to said vehicular ladder rack.

27. The vehicular ladder rack of claim 25 wherein said limit members and said retainer members cooperatively form a ladder securing means limiting transverse movement of the ladder relative to said vehicular ladder rack to secure the ladder thereto.

28. The vehicular ladder rack of claim 20 further including an elongated handle pivotally coupled to said rear portion of said elongated longitudinal positioning element by a coupling pin.

29. The vehicular ladder rack of claim 28 further including a positioning assembly lock means comprising a first and second lock element, said first lock element comprises a lock bracket affixed to said stationary mounting frame retainer element movable between an open and closed position pivotally coupled thereto and said second lock element comprises a lock bar affixed to outer end portion of said elongated handle; said lock bar being disposed between said lock bracket and said retainer element when said retainer element is in said closed position to secure said elongatged handle to said positioning assembly lock means.

30. The vehicular ladder rack of claim 20 further including a retainer member is affixed to each of said pair of ladder support frame members to retain a ladder therein to secure the ladder vertically and longitudinally said vehicular ladder rack.

31. A vehicular ladder rack for use with a vehicle comprising a stationary mounting frame including a pair of transverse frame members each including an end portion affixed to a roof of a vehicle, a positioning assembly including a pair of positioning members affixed to opposite end portions of an elongated longitudinal positioning element including a rear portion rotatable between a first and second position coupled to said pair of transverse frame member and a ladder support frame including a pair of ladder support members each including an inner end movable between a first and second position to support a ladder thereon operatively coupled between said pair of transverse frame members and said corresponding positioning members such that a ladder is supported above the roof of the vehicle for storage and transportation when said elongated longitudinal positioning element and said ladder support frame are each in said first position and when said ladder support frame is moved from said first to said second position as said elongated longitudinal positioning element is rotated from said first to said second position said ladder support frame is disposed adjacent a side of the vehicle to permit a ladder to be mounted on said ladder support frame or removed from said ladder support frame, an elongated handle pivotally coupled to said rear portion of said elongated longitudinal positioning element by a coupling pin and a positioning assembly lock means comprising a first and second lock element, said first lock element comprises a lock bracket affixed to said stationary mounting frame retainer element movable between an open and closed position pivotally coupled thereto and said second lock element comprises a lock bar affixed to outer end portion of said elongated handle; said lock bar being disposed between said lock bracket and said retainer element when said retainer element is in said closed position to secure said elongated handle to said positioning assembly lock means.

32. The vehicular ladder rack of claim 31 wherein said stationary mounting frame further includes a directional control device attached to the corresponding end portion of each of said pair of transverse frame members to engage and control the direction of travel of said pair of ladder support members.

33. The vehicle ladder rack of claim 32 wherein each said directional control device comprises at least one roller rotatable coupled to said corresponding transverse frame members.

34. The vehicular ladder rack of claim 33 wherein each of said pair of ladder support members comprises a C-shaped ladder support member including a pair of channels and each said directional control device comprises a pair of rollers rotatable coupled to opposite sides of each said transverse frame member wherein each said roller of each said pair of rollers is disposed within one of said pair of channels of each said pair of ladder support members.

35. The vehicular ladder rack of claim 32 wherein said stationary mounting frame further include a limit member extending upwardly from each of said pair members in spaced relationship relative to said corresponding directional control device to limit inward movement of the ladder when mounted on said vehicular ladder rack.

36. The vehicular ladder rack of claim 35 wherein a retainer member is affixed to each of said pair of ladder support frame members to retain a ladder therein to secure the ladder vertically and longitudinally to said vehicular ladder rack.

37. The vehicular ladder rack of claim 36 wherein said limit members and said retainer members cooperatively form a ladder securing means limiting transverse movement of the ladder relative to said vehicular ladder rack to secure the ladder thereto.

38. The vehicular ladder rack of claim 35 wherein an elongated slot is formed in each of said pair of ladder support members to receive one of said limit members.

39. The vehicular ladder rack of claim 31 wherein each of said pair of positioning members comprises a substantially L-shaped spositioning arm coupled to said inner ends of said corresponding ladder support member by a corresponding coupling pin.

40. The vehicular ladder rack of claim 31 further including a retainer member is affixed to each of said pair of ladder support frame members to retain a ladder therein to secure the ladder vertically and longitudinally said vehicular ladder rack.

* * * * *